United States Patent
Fournier et al.

(10) Patent No.: US 6,694,263 B2
(45) Date of Patent: Feb. 17, 2004

(54) METHOD FOR FACILITATING MONITORING, IN THE COURSE OF TIME, OF THE EVOLUTION OF AN UNDERGROUND ZONE BY COMPARED ANALYSIS OF VARIOUS SEISMIC RECORD SETS

(75) Inventors: Frédérique Fournier, Cormeilles en Parisis (FR); Nathalie Lucet, Houilles (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/126,605

(22) Filed: Apr. 22, 2002

(65) Prior Publication Data

US 2002/0161526 A1 Oct. 31, 2002

(30) Foreign Application Priority Data

Apr. 27, 2001 (FR) .............................. 01 05675

(51) Int. Cl.$^7$ ................................. G01V 1/28

(52) U.S. Cl. ............................. 702/14; 702/6

(58) Field of Search ....................... 702/14, 6

(56) References Cited

U.S. PATENT DOCUMENTS

| | | | |
|---|---|---|---|
| 5,444,619 A | | 8/1995 | Hoskins et al. |
| 6,052,651 A | | 4/2000 | Fournier |
| 6,272,444 B1 | * | 8/2001 | Thevoux-Chabuel et al. ............ 702/179 |
| 6,374,185 B1 | * | 4/2002 | Taner et al. ................... 702/6 |

OTHER PUBLICATIONS

Fournier F. et al; "A Statistical Methodology for Deriving Reservoir Properties From Seismic Data" Geophysics of Exploration Geophysicists. Tulsa, US, vol. 60, No. 5, Sep. 1, 1995, pp. 1437–1450 XP002070858; ISSN: 0016-8033.

Dumay J. et al ; "Multivariate Statistical Analyses Applied to Seismic Facies Recognition" Geophysics, Sep. 1988, USA, vol. 53, No. 9, pp. 1151–1159, XP002187537; ISSN: 0016-8033.

Sonneland Lars et al., "Seismic Reservoir Monitoring on Gullfaks" Leading Edge; Leading Edge (Tulsa, OK) Sep. 1997 SOC of Exploration Geophysicists, Tulsa, OK, USA, vol. 16, No. 9, Sep. 1997, pp. 1247–1252, XP002187538.

Burns, C. Scott: "4D Seismic Interpretive Processing: Optimizing Differential Imaging For Reservoir Monitoring" Proceedings of the 1998 European Petroleum Conference, Europec. Part 2 (of 2); Hague, Neth Oct. 20–22, 1998, pp. 329–343, XP002187539, Richardson, TX, USA.

* cited by examiner

*Primary Examiner*—Marc S. Hoff
*Assistant Examiner*—Anthony Gutierrez
(74) *Attorney, Agent, or Firm*—Antonelli, Terry, Stout & Kraus, LLP

(57) ABSTRACT

The present invention relates to a method for facilitating monitoring, in the course of time, of the evolution of an underground zone by compared analysis of a certain number n of seismic record sets obtained respectively after n successive 3D seismic surveys (method referred to as 4D seismic method). The method comprises using a pattern recognition technique applied to all of the seismic events of the n surveys considered and analyzed simultaneously, which allows showing the evolution of the seismic events in the subsoil. The invention has an application for monitoring of changes occurring in a reservoir zone of the subsoil during production for example.

20 Claims, 5 Drawing Sheets

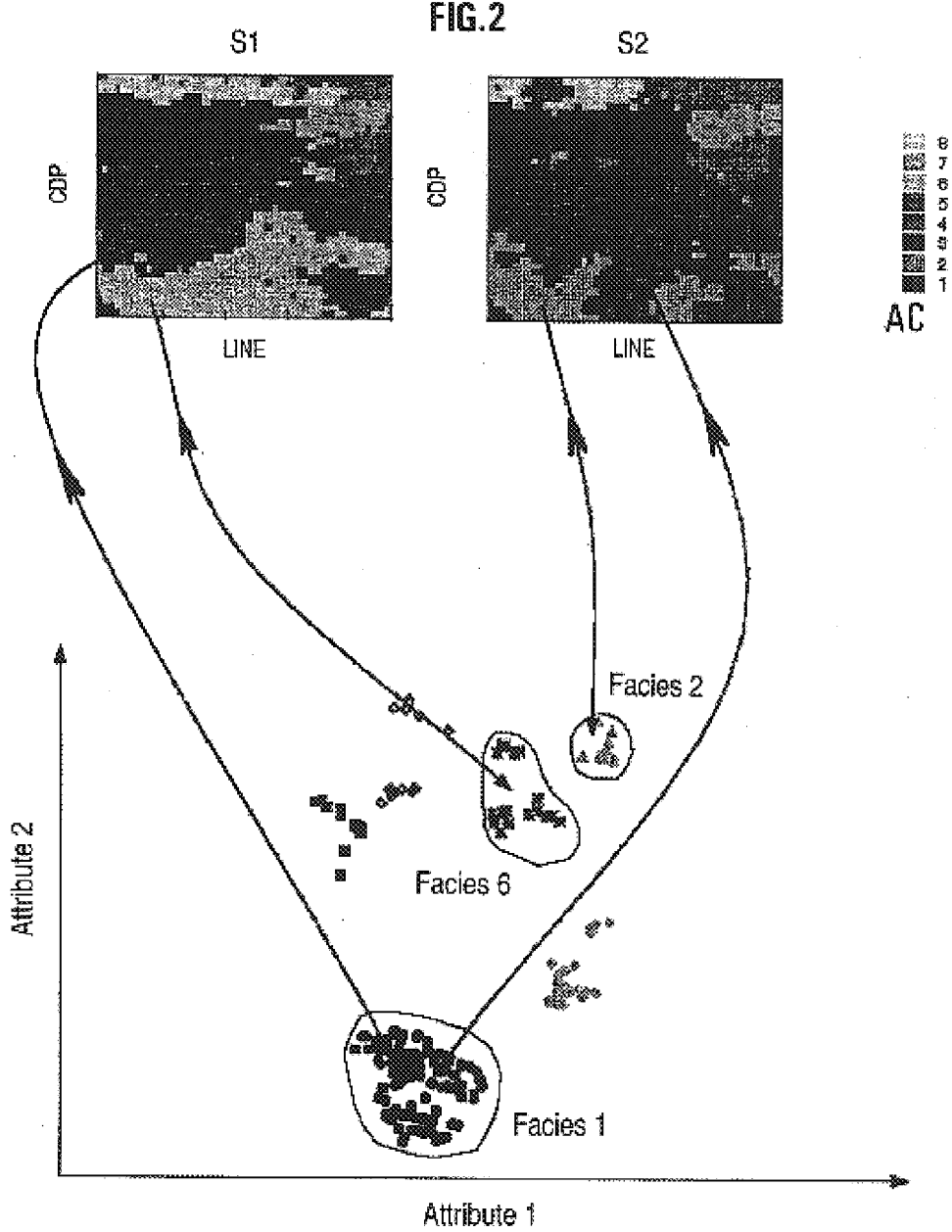

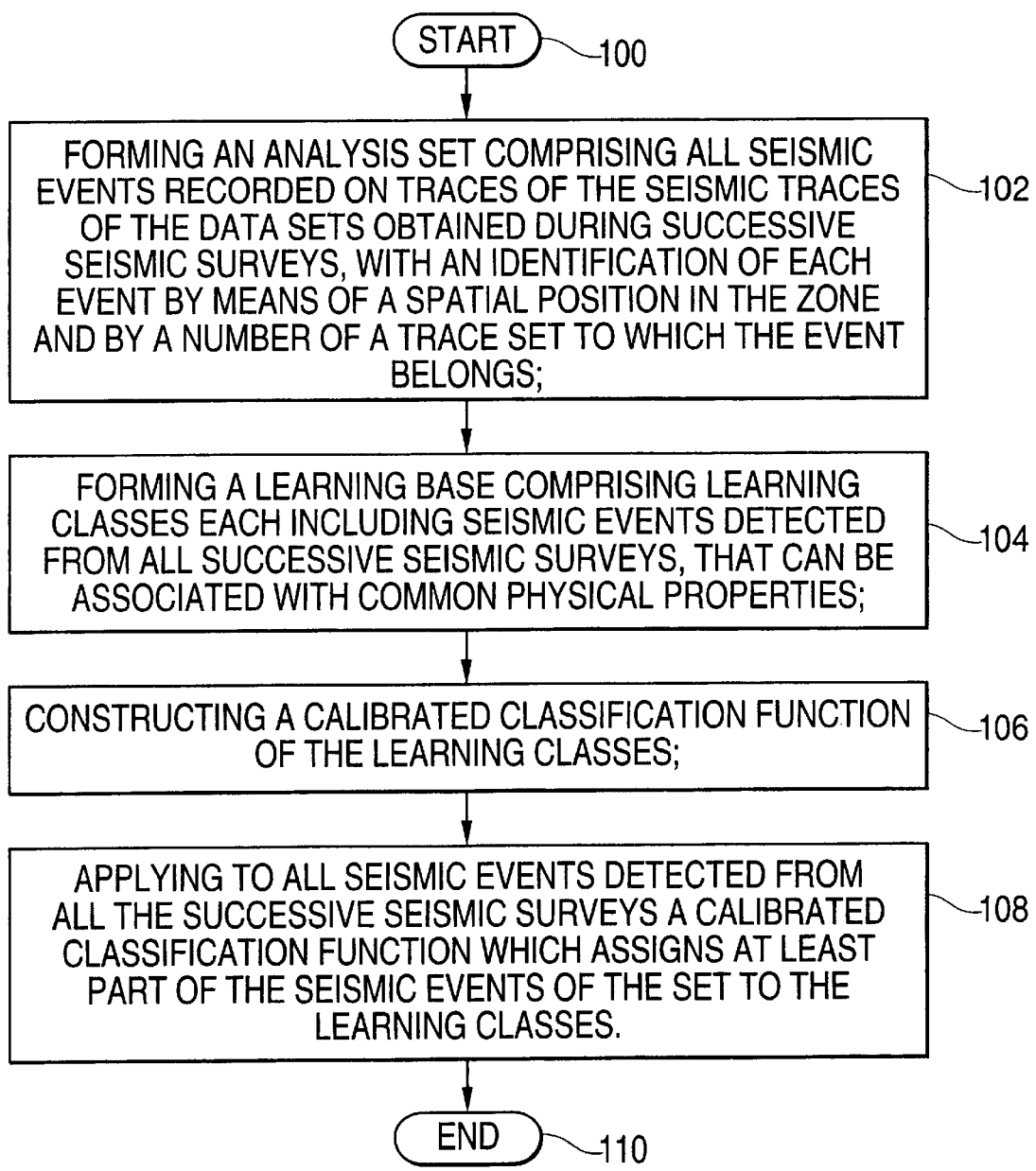

METHOD FOR FACILITATING MONITORING, IN THE COURSE OF TIME, OF THE EVOLUTION OF AN UNDERGROUND ZONE BY COMPARED ANALYSIS OF VARIOUS SEISMIC RECORD SETS

BACKGROUND OF THE INVENTION

1. Field of the Invention

The present invention relates to a method for facilitating monitoring, in the course of time, of the evolution of seismic events in a zone of interest in an underground formation (a reservoir zone for example), by compared analysis of a certain number n of seismic record sets obtained respectively after successive 3D seismic surveys (technique referred to as 4D seismic method).

2. Description of the Prior Art

Seismic measurements are conventionally used to provide additional information, in relation to drilling data, on the variations of the subsoil formations: lithologic, petrophysical or fluid saturation variations. In particular, within the scope of hydrocarbon reservoir production, it has become quite frequent to record seismic measurements repeatedly and then to interpret the seismic measurement variations in connection with the saturation and pressure variations due to reservoir production phenomena.

A conventional method of using these records analyzes directly the amplitude (or any other seismic attribute) differences between the various surveys. Interpretation is then often backed up by modeling the acoustic behavior of the subsoil according to the estimated changes in the physical properties thereof. An example of this approach is described in:

Johnston, D., 2000, "Using Legacy Seismic Data in an Integrated Time-Lapse Study: Lena Field, Gulf of Mexico", The Leading Edge, 19, No.3.

It may sometimes be difficult to interpret the data based on amplitude (or any other trace attribute) differences. In fact, variations in the physical properties of the rock in the course of time, related for example to the reservoir production, to the use of enhanced recovery methods, etc., lead to variations in the amplitude of the seismic traces in the reservoir, and also to time lags (lengthening or shortening of the trace). The difference between two seismic traces may therefore be difficult to interpret since it results from amplitude changes as well as from time lags which eclipse these amplitude variations as can be seen in FIG. 1.

Another approach consists in using statistical pattern recognition techniques allowing classification of the seismic events into various categories according to the different physical states of the reservoir. These approaches are for example described in:

Dumay, J., Fournier, F., 1988, "Multivariate Statistical Analyses Applied to Seismic Facies Recognition", Geophysics, 53, No.9, pp.1151–1159.

They can be applied, in the case of the interpretation of repeated seismic surveys, to the seismic amplitudes of the various seismic surveys, to any attribute deriving from the seismic trace or to the amplitude differences between surveys. These pattern recognition techniques can be used with or without learning, as already described and implemented in U.S. Pat. No. 6,052,651 and patent application EN-0,011,618, both filed in the name of the assignee.

Within the scope of repeated seismic surveys, an example of seismic events classification with learning, where learning has been carried out using the seismic data of a first survey and the classification applied independently to this first survey, then to a repeated survey, can be found in:

Sonneland, L., Veire, H. F., Raymond, B., Signer, C., Pedersen, L., Ryan, S., Sayers, C., 1997, "Seismic Reservoir Monitoring on Gullfalks", The Leading Edge, 16, No.9, pp.1247–1252.

SUMMARY OF THE INVENTION

In order to be free from the artifacts related to the calculation of the amplitude (or any other seismic attribute) differences and to analyze the evolution of seismic events in the course of time in its entirety, the invention is a method allowing classification of these events according to their overall pattern, while simultaneously analyzing as a whole the seismic measurements obtained from the various surveys.

The invention provides studying and interpretation of an evolution of the seismic records which are related to the evolution of the physical properties of the zone as a result of production mechanisms.

Seismic events are understood to be seismic trace portions taken in the zone of interest from the successive record sets or traces. The seismic events to be classified are characterized by seismic parameters or attributes. These attributes can be of different types. They can consist, for example, of the succession of the amplitudes of the seismic trace portions (contained in the seismic window studied).

The method of the invention detects the physical changes undergone in the course of time by a subsoil zone, by analysis of the changes observable in seismic events characterized each by seismic attributes, recorded within a time window, on the seismic traces of several data sets obtained respectively during successive seismic surveys (repeated or 4D seismic surveys), comprising using a pattern recognition technique to classify the seismic events. The method comprises:

forming an analysis set comprising all the seismic events recorded on the traces of the various seismic trace sets, with identification of each seismic event by means of its spatial position in the zone and by the number of the trace set to which the seismic event belongs, forming a learning base comprising learning classes each comprising a certain number of seismic events that can be associated with common physical properties, constructing a calibrated classification function on the defined learning classes, and applying to all of the seismic events the calibrated classification function so as to assign at least part of the seismic events of the set to the various learning classes.

Construction of a calibrated classifying function is for example carried out by means of a discriminant analysis technique, or by a neural network technique.

According to an implementation mode, the learning base is formed for example from seismic events measured in the vicinity of wells drilled through the formation studied, by defining therefrom learning classes corresponding to different rock natures or to different fluid contents.

According to another implementation mode, the learning classes are formed for example by non-supervised classification of the seismic events.

In particular, the modes of a multivariate probability density function calculated from all of the seismic events characterized by the associated attributes can be used.

According to another implementation mode, the learning base is formed by selecting the seismic traces in the most representative parts of the various estimated physical states of the zone, and of their variations, obtained for example with a numerical flow and production simulation model.

To analyze the results, it is possible, for example, to create classification difference charts from repeated surveys, allowing better highlighting of the class changes of a seismic event from one survey to the next.

It is thus possible to detect, in the course of time, changes in the overall pattern of the seismic trace, or a contrario stabilities of the seismic events in certain zones which are either out of reach of the recovery process used, or seismically insensitive to the physical state variations of the reservoir.

BRIEF DESCRIPTION OF THE DRAWINGS

Other features and advantages of the method according to the invention will be clear from reading the description hereafter of a non-limitative example, with reference to the accompanying drawings wherein:

FIG. 2 is a flowsheet of the classification of all of the seismic events in the space generated by the seismic attributes, this flowsheet being illustrated for the interpretation of the first two seismic surveys S1 and S2;

FIG. 5 illustrates a flowchart of the process of the present invention.

DETAILED DESCRIPTION OF THE PREFERRED EMBODIMENTS

Figure 1B:
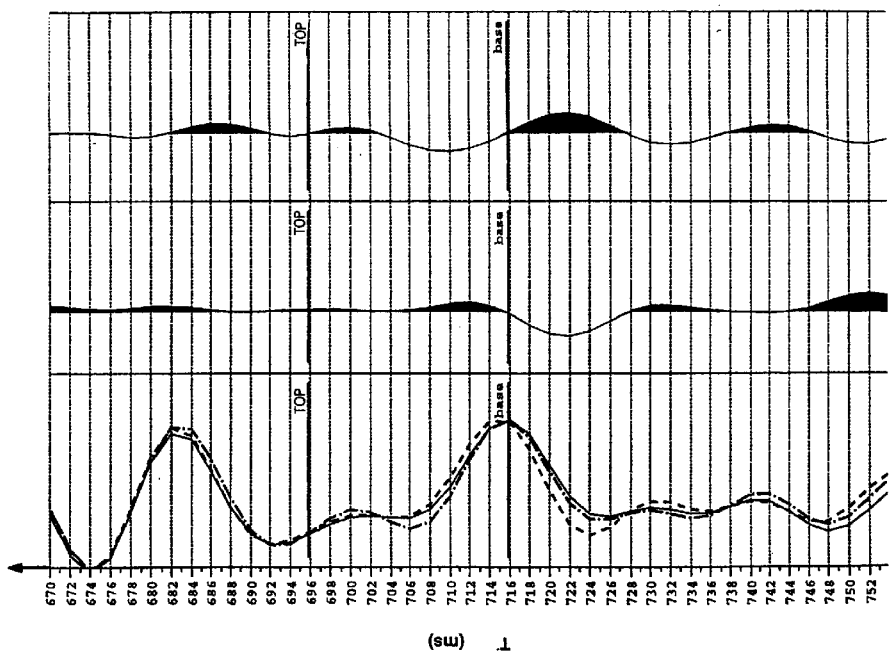
FIG. 1A shows an example of seismic events recorded during three different seismic surveys S1, S2 and S3 in a reservoir produced between acquisitions S1 and S2; the "difference events" (changes) between the seismic surveys are shown in FIG. 1B.

The seismic events to be classified consist of all of the seismic traces resulting from the n repeated 3D seismic surveys considered for the reservoir. These seismic events are characterized by seismic parameters or attributes extracted from the various records obtained from the repeated seismic survey, at the level of the target zone of the subsoil, in most cases a hydrocarbon reservoir. The methodology for defining the classes comprises the following stages:

a) The first stage is a stage of definition of learning classes. This stage is carried out by simultaneous analysis of the seismic events available from all the surveys. A first possibility consists in extracting the seismic events recorded in the vicinity of wells, whose geologic interpretation (and the evolution in the course of time of this interpretation) has been carried out. This methodology will thus allow classification of all of the seismic events according to geologic variations observed in the wells. The second possibility consists in carrying out a non-supervised analysis of all of the seismic events recorded during the various surveys, using for example the technique described in the aforementioned U.S. Pat. No. 6,052,651. There are other possibilities, for example of defining the learning classes using mathematical modeling of the expected physical states in the reservoir, considering the variations generated by the reservoir's production. The point to be emphasized is that the seismic events are considered and analyzed simultaneously for all the surveys.

b) The second stage consists in calibrating a classification function from the seismic events selected in the previous stage so as to represent the physical state classes which are considered. This calibration can be done, for example, by discriminant analysis.

Once this classification function is calibrated, the classification function is implemented during the third stage in order to assign the seismic events of all of the surveys to the various classes considered in the previous stage, and thus to create for each survey a classification chart of seismic events.

Finally, charts representing seismic facies differences from one survey to the next can be created in order to detect the assignment changes of certain seismic traces in time.

The various stages of the method are clearly illustrated by the drawings.

In order to monitor the physical changes in the reservoir related to the production mechanisms, three seismic surveys have been recorded: the first one before producing the reservoir, and the other two several months after the start of production. These changes are analyzed within a constant 20-ms time window shown in FIGS. 1A and 1B. This time window approximately corresponds to the reservoir zone. The seismic events analyzed are then the seismic trace portions that can be extracted from each of these data volumes, within this window. The attributes used to represent these events are the values of the amplitudes sampled over the 11 successive time intervals included in the 20-ms window.

Figure 1A:
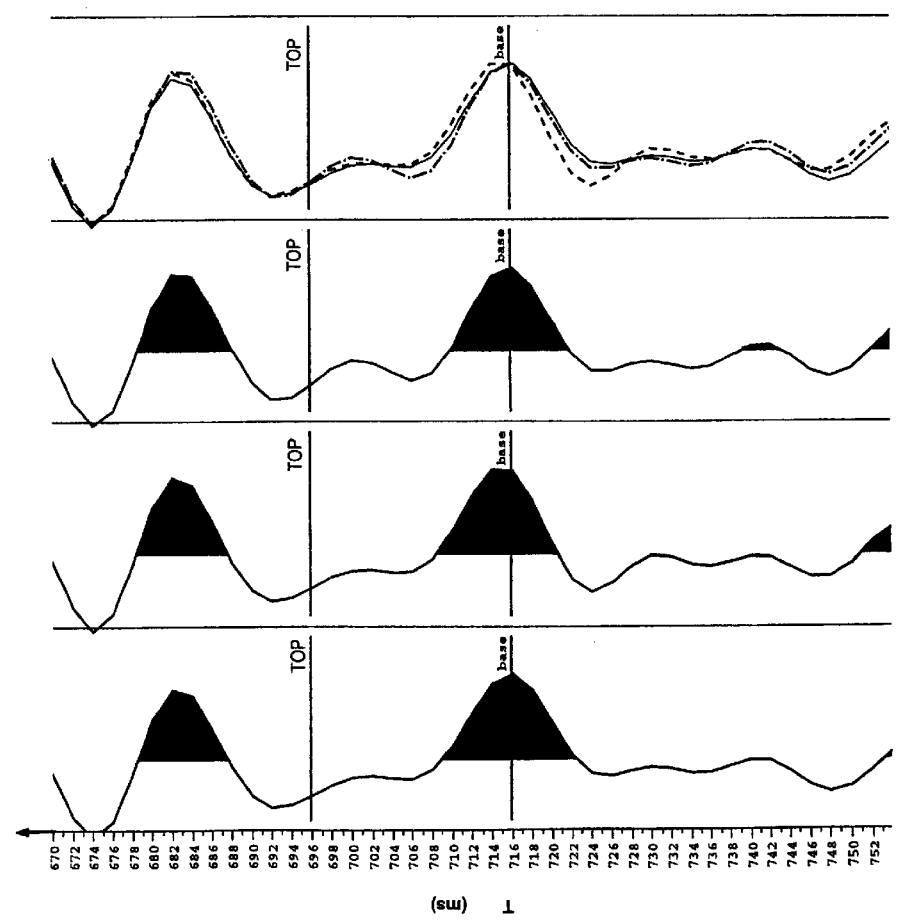

Careful observation of FIGS. 1A and 1B shows, for a particular spatial position, that the variations of the events in this position after the three surveys concern both their amplitude and their form. Simple calculation of a "difference event", which is the result of a subtraction of the values of the attributes of two events belonging to two different surveys, but located in the same place ("difference events" represented in FIG. 1B), does not accurately take into account these amplitude and form variations, the latter being related to travel time variations of the seismic wave. Pertinent analysis therefore requires comparison of the events of all of the surveys in relation to one another by studying them as a whole so as to integrate the two variation types in the analysis.

The learning classes representing the different physical states of the reservoir have been defined from the multivariate probability density function calculated on all of the events of the three seismic surveys S1 to S3 in a space generated by the aforementioned 11 seismic attributes. The learning samples of the classes are chosen by selecting the events belonging to the high-value peaks of the density function.

An event classification function is then established, for example by means of a discriminant analysis calibrated on the learning classes.

Figure 3A:
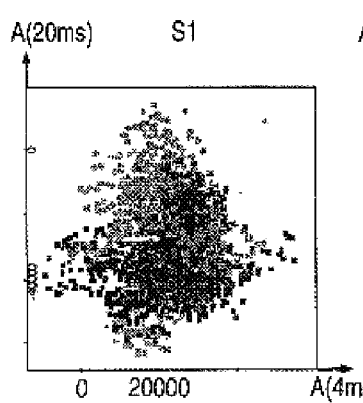
FIGS. 3A to 3C show the true projections of the seismic events of surveys S1, S2 and S3, analyzed simultaneously, in the space of the seismic attributes, whose analysis leads to three classification charts, two of them being shown in FIG. 2 by way of illustration (those relative to surveys S1 and S2)
Figure 3B:
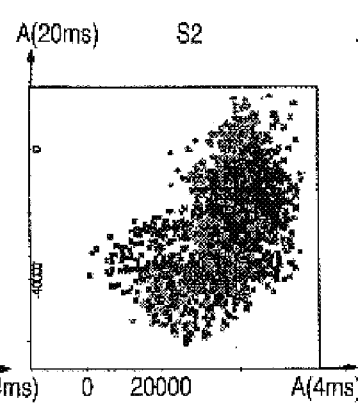
Figure 3C:
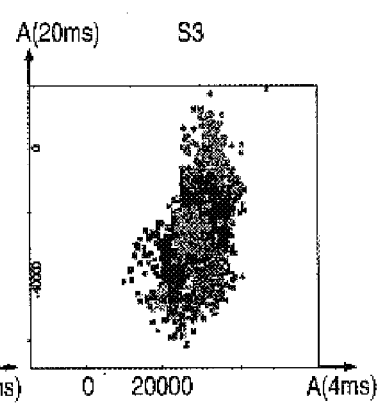

This classification function is then applied to all of the seismic events of the three surveys S1, S2 and S3 so as to assign them to one of the learning classes. The various classes resulting from this assignment can be represented in planes of the seismic attributes space, as shown in FIGS. 3A to 3C, which show the plane generated by the amplitude of the top in the window centered on the reservoir (A(20 ms))

as a function of the amplitude 4 ms above the base of the reservoir (A(4 ms)). This plane is displayed three times (FIGS. 3a to 3c) to show separately the classifications of the events belonging respectively to the three seismic surveys considered, S1, S2 and S3. However, in the space of the attributes, the events have been classified simultaneously and are distinguished by survey only to facilitate display of the classes and their evolution as a function of time, that is as a function of their belonging to the different seismic surveys S1, S2 and S3.

The results for surveys S1 (before producing the reservoir) and S2 (first survey after producing) are also presented in form of class charts (FIG. 2) which show the physical states of the reservoir and their evolution in the course of time (between S1 and S2). It can thus be observed that, although the northern edge of the reservoir is not affected by production (same class distribution between surveys S1 and S2), the southern part is characterized by the disappearance of a class between S1 and S2, compensated by the appearance of a new class mainly in the south-western zone, and the spatial extension of one of the main classes of the chart associated with S1. These evolutions can of course also be found in the planes of FIGS. 3A to 3C concerning surveys S1 and S2.

Figure 4:
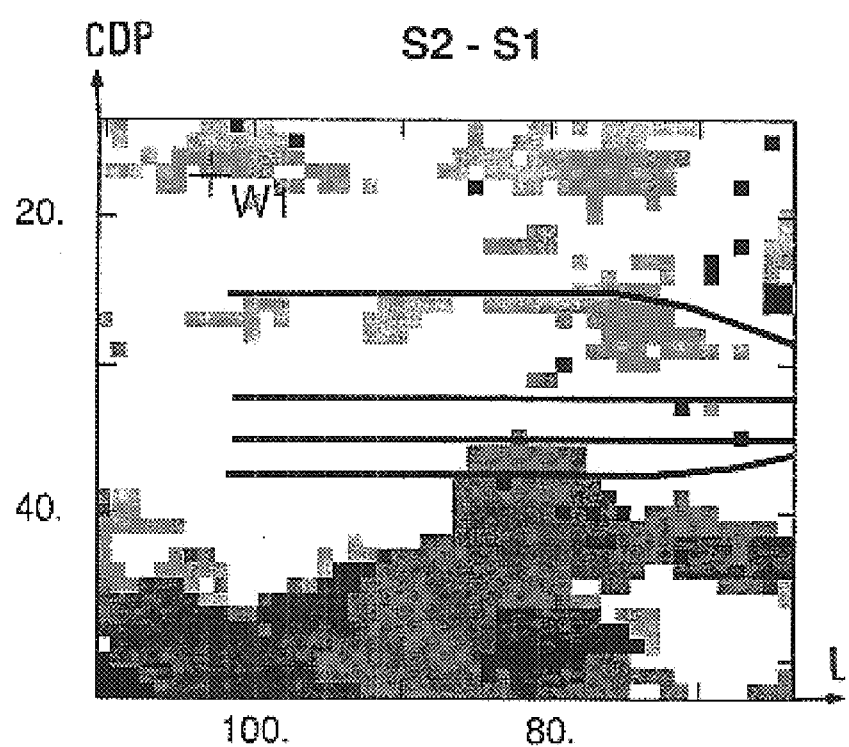
FIG. 4 shows the classification difference charts of the seismic events, obtained from the classifications of surveys S1 and S2.

These charts can also be interpreted by analyzing the changes in the assignment to the classes of the events from one survey to the next. The results can thus be shown as a class difference chart as shown in FIG. 4 for the differences between surveys S1 and S2, where the white zones correspond to zones where the assignment of events to a class has not changed, unlike the colored zones. The changes are mainly distributed in the southern part of the reservoir.

FIG. 5 illustrates a flowchart of a method for detecting physical changes over a course of time in a subsoil zone, by analysis of changes observable on seismic events including seismic attributes, recorded within a time window, on seismic traces of data sets obtained respectively during successive seismic surveys, by using a pattern recognition technique to classify the seismic event, with formation of a learning base with classes and construction of a classification function for the seismic events. The method proceeds from starting point 100 to point 102 where forming an analysis comprising all seismic events recorded on traces of the seismic traces of the data sets obtained during successive seismic surveys, with an identification of each event by means of a spatial position in the zone and by a number of a trace set to which the event belongs occurs. The method proceeds from point 102 to point 104 where forming a learning base comprising learning classes each including seismic events detected from all successive seismic surveys, that can be associated with common physical properties occurs. The method proceeds form point 104 to point 106 where constructing a calibrated classification function of the learning classes occurs. The method proceeds from point 106 to point 108 where applying to all seismic events detected from all successive seismic surveys a calibrated classification function which assigns at least part of the seismic events of the set to the learning classes occurs. The method proceeds from point 108 to endpoint 110.

What is claimed is:

1. A method for detecting physical changes over a course of time in a subsoil zone, by analysis of changes observable on seismic events including seismic attributes, recorded within a time window, on seismic traces of data sets obtained respectively during successive seismic surveys, by using a pattern recognition technique to classify the seismic events, with formation of a learning base with classes and construction of a classification function for the seismic events, comprising:

forming an analysis set comprising all seismic events recorded on traces of the seismic traces of the data sets obtained, during successive seismic surveys, with an identification of each event by means of a spatial position in the zone and by a number of a trace set to which the event belongs;

forming a learning base comprising learning classes each including seismic events detected from all successive seismic surveys, that can be associated with common physical properties;

constructing a calibrated classification function of the learning classes; and applying to all seismic events detected from all the successive seismic surveys a calibrated classification function which assigns at least part of the seismic events of the set to the learning classes.

2. A method as claimed in claim 1, wherein construction of a calibrated classification function is carried out using a discriminate analysis technique.

3. A method as claimed in claim 2, wherein the learning base is formed from seismic events measured in a vicinity as wells drilled through the zone, by defining therefrom learning classes corresponding to different rock types or to different fluid contents.

4. A method as claimed in claim 3, wherein the learning classes are formed by non-supervised classification of the seismic events.

5. A method as claimed in claim 4, wherein the learning base is formed according to modes of a multivariate probability density function calculated from all seismic events described by associated attributes.

6. A method as claimed in claim 2, wherein the learning classes are formed by non-supervised classification of the seismic events.

7. A method as claimed in claim 6, wherein the learning base is formed according to modes of a multivariate probability density function calculated from all seismic events described by associated attributes.

8. A method as claimed in claim 1, wherein construction of a calibrated classification function is carried out using a neural network technique.

9. A method as claimed in claim 8, wherein the learning base is formed from seismic events measured in a vicinity as wells drilled through the zone, by defining therefrom learning classes corresponding to different rock types or to different fluid contents.

10. A method as claimed in claim 9, wherein the learning classes are formed by non-supervised classification of the seismic events.

11. A method as claimed in claim 10, wherein the learning base is formed according to modes of a multivariate probability density function calculated from all seismic events described by associated attributes.

12. A method as claimed in claim 8, wherein the learning classes are formed by non-supervised classification of the seismic events.

13. A method as claimed in claim 12, wherein the learning base is formed according to modes of a multivariate probability density function calculated from all seismic events described by associated attributes.

14. A method as claimed in claim 1, wherein the learning base is formed from seismic events measured in a vicinity as wells drilled through the zone, by defining therefrom learning classes corresponding to different rock types or to different fluid contents.

15. A method as claimed in claim 14, wherein the learning classes are formed by non-supervised classification of the seismic events.

16. A method as claimed in claim 15, wherein the learning base is formed according to modes of a multivariate probability density function calculated from all seismic events described by associated attributes.

17. A method as claimed in claim 1, wherein the learning classes are formed by non-supervised classification of the seismic events.

18. A method as claimed in claim 17, wherein the learning base is formed according to modes of a multivariate probability density function calculated from all seismic events described by associated attributes.

19. A method as claimed in claim 1, wherein the learning base is formed by selecting seismic traces in parts which are most representative of different physical states of a first zone and of variations of the physical states.

20. A method in accordance with claim 19, wherein the different physical states are obtained with a numerical flow and production model.

* * * * *